United States Patent [19]

Oda et al.

[11] 4,306,909
[45] Dec. 22, 1981

[54] LOW-EXPANSION CERAMICS AND METHOD OF PRODUCING THE SAME

[75] Inventors: Isao Oda; Tadaaki Matsuhisa, both of Nagoya, Japan

[73] Assignee: NGK Insulators, Ltd., Nagoya, Japan

[21] Appl. No.: 152,315

[22] Filed: May 22, 1980

[30] Foreign Application Priority Data

Mar. 26, 1980 [JP] Japan ................................. 55-37523

[51] Int. Cl.³ ............................................. C04B 35/04
[52] U.S. Cl. .................................... 501/112; 501/126; 501/127; 501/132; 501/135; 501/153
[58] Field of Search ......................... 106/73.33, 62, 60

[56] References Cited

U.S. PATENT DOCUMENTS 2,776,896  1/1957  Harman et al. ................... 106/73.33
3,578,471  5/1971  Lachman ........................... 106/73.33
3,625,717 12/1971  Grubba et al. .................... 106/73.33
4,017,347  4/1977  Cleveland ........................ 106/39.5 X Primary Examiner—Helen M. McCarthy
Attorney, Agent, or Firm—Stevens, Davis, Miller & Mosher

[57] ABSTRACT

The present invention relates to low-expansion ceramics essentially consisting of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$), that major component of crystalline phase thereof is a solid solution of magnesium oxide-aluminum oxide-titanium dioxide-iron oxide, and that the ceramics has a coefficient of thermal expansion of not more than $20 \times 10^{-7}$ (1/° C.) in a temperature range of 25° C. to 800° C. and a melting point of not lower than 1,500° C., said coefficient of thermal expansion being maintained even after exposure 1,100° C. for 1,000 hours, and a method of producing low-expansion ceramics comprising steps of preparing a batch of compounds so as to provide a chemical composition of 1.5 to 20% by weight of magnesia (MgO), 8 to 68% by weight of alumina ($Al_2O_3$), 24 to 80% by weight of titanium in terms of titanium oxide, and 0.5 to 20% by weight of iron in terms of ferric oxide ($Fe_2O_3$); plasticizing the batch if necessary and shaping the batch; drying the body thus formed and firing the formed body at 1,300° C. to 1,700° C. for 0.5 to 48 hours, thereby having a coefficient of thermal expansion of less than $20 \times 10^{-7}$ (1/° C.) in a temperature range of 25° C. to 800° C. and a melting point of not lower than 1,500° C., said coefficient of thermal expansion being maintained even after exposure at 1,100° C. for 1,000 hours, wherein the shape of ceramics is a honeycomb structure.

9 Claims, 1 Drawing Figure

LOW-EXPANSION CERAMICS AND METHOD OF PRODUCING THE SAME

BACKGROUND OF THE INVENTION

This invention relates to low-expansion ceramics having a small coefficient of thermal expansion and a high melting point, which coefficient of thermal expansion scarcely varies with heating up and cooling down or soaking at high temperature and to a method of producing the ceramics.

With the progress of technology in recent years, demand for material having an excellent heat-resistance and an excellent thermal shock-resistance is increasing. The thermal shock-resistance of ceramics depends on characteristics of the material thereof, such as the coefficient of thermal expansion, the heat conductivity, the mechanical strength, the Young's modulus, and the Poisson's ratio. The thermal shock-resistance is also affected by the size and shape of the goods concerned and the conditions of heating and cooling or the rate of heat propagation. Among those factors affecting the thermal shock-resistance, the contribution of the coefficient of thermal expansion is especially large, and when the rate of heat propagation is high, the thermal shock-resistance is ruled almost solely by the coefficient of thermal expansion, as well known to those skilled in the art. Accordingly, there is a strong demand for development of low-expansion material with excellent resistance against thermal shock.

As ceramics with a comparatively low thermal expansion, which has a coefficient of thermal expansion in the order of 5 to $20 \times 10^{-7}$ (1/°C.) in a temperature range of 25° C. to 800° C., cordierite (MAS) and lithium-aluminum-silicate (LAS) are known. However, such known ceramics as a low melting point, e.g., the melting point of cordierite is 1,450° C. and that of lithium-aluminum-silicate is 1,423° C. For instance, when the ceramics are used to make ceramic honeycombs for catalyst substrate of catalytic purifying apparatus of automobiles, even the honeycomb substrate using cordierite with a high melting point has been found vulnerable to plugging due to melting if the temperature of the catalyst bed is increased by 100° C. to 200° C. over that of conventional catalyst bed. The increase of the temperature of the catalyst bed is caused by modification of the mounting position of the catalytic converter from the conventional location of under bed to engine proximity for improving the purifying efficiency of the catalyst and by design modification involving the mounting of a turbo-charger for improving the fuel economy and engine output, which modifications cause an increase in the exhaust gas temperature as compared with that of conventional apparatus. Accordingly, the development of low-expansion material having excellent heat-resistance, which also has an excellent thermal shock-resistance equivalent to or better than that of cordierite, has been strongly demanded.

BRIEF SUMMARY OF THE INVENTION

The low-expansion ceramics according to the present invention obviates the aforesaid shortcomings and difficulties of the prior art. The inventors have succeeded in achieving the low-expansion characteristics which substantially free from changes even after long heat treatments of 2,000 to 5,000 hours at about 1,000° C. to 1,200° C. and even after repeated exposure to heating up and cooling down by using ceramics consisting essentially of oxides of magnesium, aluminum, titanium, and iron.

An object of the present invention is to provide low-expansion ceramics essentially consisting of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$), wherein the major component of crystalline phase thereof is a solid solution of magnesium oxide-aluminum oxide-titanium dioxide-iron oxide, and the ceramics have a coefficient of thermal expansion of not more than $20 \times 10^{-7}$ (1/°C.) in a temperature range of 25° C. to 800° C. and a melting point of not lower than 1,500° C., said coefficient of thermal expansion being maintained even after exposure at 1,100° C. for 1,000 hours.

Another object of the present invention is to provide a method of producing low-expansion ceramics comprising steps of preparing a batch of compounds so as to provide a chemical composition of 1.5 to 20% by weight of magnesia (MgO), 8 to 68% by weight of alumina ($Al_2O_3$). 24 to 80% by weight of titanium in terms of titanium oxide ($TiO_2$), and 0.5 to 20% by weight of iron in terms of ferric oxide ($Fe_2O_3$); plasticizing the batch if necessary and shaping the batch, drying the body thus formed; and firing the formed body at 1,300° C. to 1,700° C. for 0.5 to 48 hours, thereby having a coefficient of thermal expansion of less than $20 \times 10^{-7}$ (1/°C.) in a temperature range of 25° C. to 800° C. and a melting point of not lower than 1,500° C., said coefficient of thermal expansion being maintained even after exposure at 1,100° C. for 1,000 hours.

A further object of the present invention is to provide a method of producing low-expansion ceramics, wherein said compounds so selected as to provide the chemical composition of 1.5 to 20% by weight of magnesia (MgO), 6 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$) are in a mixture of materials selected from the group consisting of magnesia, magnesium carbonate, magnesium hydroxide, alumina, aluminum hydroxide, anatase type titanium dioxide, rutile type titanium dioxide, metallic iron $\alpha$ type ferric oxide, $\gamma$ type ferric oxide, hydrous iron oxide, and ilmenite.

A still further object of the present invention is to provide low-expansion ceramics having honeycomb structure.

In this specification, titanium is assumed to be four valency, even though it is able to form non-stoichiometric composition with oxide.

DETAILED DESCRIPTION OF THE INVENTION

Figure 1:
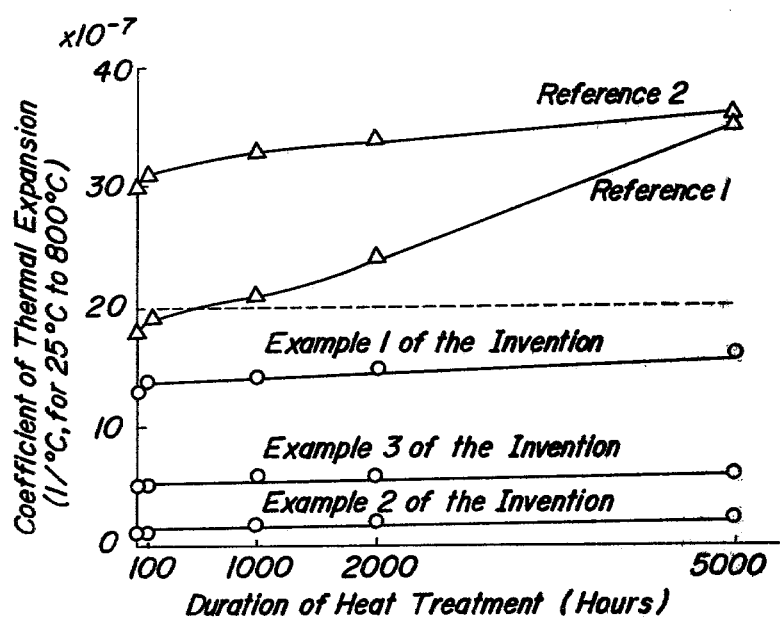
FIG. 1 is a characteristic diagram showing the relationship between the duration of heat treatment at 1,100° C. and coefficients of thermal expansion in a temperature range of 25° C. to 800° C. for low-expansion ceramics of the invention and ceramics of references.

A method of producing the low-expansion ceramics according to the present invention will be now explained. A mixture of materials selected from the group consisting of magnesia, magnesium carbonate, magnesium hydroxide, alumina, aluminum hydroxide, anatase type titanium dioxide, rutile type titanium dioxide, metallic iron, α type ferric oxide, γ type ferric oxide, hydrous iron oxide, and ilmenite is prepared so as to give a chemical composition of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$). If necessary, a plasticizer is added into the mixture thus formed for obtaining a batch which is shapable in a plastic manner, and the batch is formed by a ceramic forming process selected from the processes of extrusion, pressing, slip casting, and injection molding. The formed body is dried. The dried body is then heated by increasing its temperature at a rate of 5° C./hour to 300° C./hour and fired at 1,300° C. to 1,700° C. for 0.5 to 48 hours. Whereby, the low-expansion ceramics according to the present invention is produced.

The starting materials for the low-expansion ceramics of the present invention are not restricted to the aforesaid substances, and in addition various natural materials which consist essentially of the aforesaid chemical compositions can be also used for producing the low-expansion ceramics.

As pointed out above, the low-expansion ceramics of the present invention can be formed by any of the conventional forming processes available for ceramics. The shape of the final product is not restricted at all: for instance, the final product can be a honeycomb body having a thin walled matrix with a plurality of cells extending from one end to the opposite end thereof, and the cross section of the cells of the honeycomb body can be of any geometrical form such as triangular, rectangular, hexagonal, any polygonal, circular or a combination thereof; a complicatedly shaped three-dimensional body, a thick body, a block of various shapes, or a body of almost any shape and any structure.

The reasons for the various limitations in the present invention are as follows. The reason for limiting the chemical composition of the ceramics of the range of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$) is in that this range of the chemical composition provides the low-expansion ceramics with an excellent heat-resistance having a coefficient of thermal expansion of not more than $20 \times 10^{-7}$ (1/°C.) in a temperature range of 25° C. to 800° C. and a melting point of 1,500° C. or higher, which coefficient of thermal expansion is maintained even after exposure of 1,100° C. for 1,000 hours. On the contrary, chemical compositions outside the aforesaid range produce an increased amount of different crystalline phase having a larger thermal expansion and more particularly produce a coefficient of thermal expansion of greater than $20 \times 10^{-7}$ (1/°C.) and an inferior thermal shock-resistance.

The reason for limiting the content of iron in the aforesaid chemical composition of 0.5 to 20% by weight in terms of ferric oxide ($Fe_2O_3$) is in that this range of iron content provides special effects of preventing the coefficient of thermal expansion from changing upon exposure at a constant temperature for a long time, such as at 1,000° C. to 1,200° C. for more than 2,000 hours or to repeated heating up and cooling down, and in that said range of iron content provides ceramics of low-expansion characteristics with a coefficient of thermal expansion of not more than $20 \times 10^{-7}$ (1/°C.) in the temperature range of 25° C. to 800° C. and a high melting point of 1,500° C. or higher. If the content of iron is less than 0.5% by weight in terms of ferric oxide ($Fe_2O_3$), the change of the coefficient of thermal expansion is specially affected and becomes large upon exposure to heating and cooling at a constant temperature for a long time, such as at 1,000° C. to 1,200° C. for more than 2,000 hours or to repeated heating up and cooling down. If the aforesaid content of iron exceeds 20% by weight, the melting point of the ceramics becomes lower than 1,500° C. and the heat-resistance is reduced, and the coefficient of thermal expansion of the ceramics in the temperature range of 25° C. to 800° C. becomes larger than $20 \times 10^{-7}$ (1/°C.) and the thermal shock-resistance is reduced.

It is noted here that the major component of the crystalline phase of the low-expansion ceramics of the invention is the solid solution of magnesium oxide-aluminum oxide-titanium dioxide-iron oxide, and the invention allows the presence of not more than 20% by weight, preferably not more than 10% by weight, of at least one second crystalline phase selected from the group consisting of rutile, spinel, and corundum, because this range of the second crystalline phase improves the heat-resistance by increasing the softening temperature and the melting temperature of the ceramics and reducing the gradient of the softening-shrinkage curve from the softening temperature to the melting temperature, without deteriorating the low-expansion characteristics.

Examples of the present invention will now be explained.

Referring to Table 1, compositions of Examples 1 through 3 of the invention and References 1 and 2 were prepared by weighing starting materials selected so as to provide the listed chemical composition. Two parts by weight of a binder of vinyl acetate system were added to 100 parts by weight of the composition thus prepared, and the binder was thoroughly mixed with the composition, and then rod-shaped test pieces of 10 mm × 10 mm × 80 mm were made by pressing at a pressure of 1,000 kg/cm². The rod-shaped test pieces thus formed were fired under the firing conditions of Table 1, whereby the ceramics of the Examples 1 through 3 of the invention and References 1 and 2 were made.

The rod-shaped test pieces of the Examples 1 through 3 of the invention and References 1 and 2 were subjected to heat treatments at a temperature which is most likely to cause changes in the coefficient of thermal expansion upon exposure to long-time heat treatment; namely, at 1,100° C. for 100 hours, 1,000 hours, 2,000 hours, and 5,000 hours. The coefficients of thermal expansion in the temperature range of 25° C. to 800° C. and the melting points of the test pieces before the aforesaid heat treatments at 1,100° C. were measured. Their coefficients of thermal expansion in the range of 25° C. to 800° C. after the aforesaid heat treatment at 1,100° C. were also measured.

The results are shown in Table 1.

TABLE 1

| | | | Examples of the invention | | | References | |
|---|---|---|---|---|---|---|---|
| | | | 1 | 2 | 3 | 1 | 2 |
| Chemical composition | MgO | (Wt %) | 10.0 | 7.0 | 4.5 | 11.0 | 8.0 |
| | $Al_2O_3$ | (Wt %) | 38.0 | 31.0 | 33.0 | 20.0 | 15.0 |
| | $TiO_2$ | (Wt %) | 50.0 | 57.0 | 52.5 | 69.0 | 52.0 |
| | $Fe_2O_3$ | (Wt %) | 2.0 | 5.0 | 10.0 | — | 25.0 |
| Firing | Temper- | (°C.) | 1550 | 1500 | 1450 | 1500 | 1400 |

TABLE 1-continued

| conditions | | Examples of the invention | | | References | |
|---|---|---|---|---|---|---|
| | | 1 | 2 | 3 | 1 | 2 |
| | ature Retention time (hours) | 5 | 3 | 10 | 3 | 5 |
| Coefficient of thermal expansion | $\times 10^{-7}$ (1/°C.) | 13 | 1 | 5 | 18 | 30 |
| Melting point | (°C.) | 1680 | 1710 | 1590 | 1670 | 1350 |
| Coefficient of thermal expansion $\times 10^{-7}$ (1/°C.), after heat treatment at 1,100° C. for | 100 (hours) | 14 | 1 | 5 | 19 | 31 |
| | 1,000 (hours) | 14 | 2 | 6 | 21 | 33 |
| | 2,000 (hours) | 15 | 2 | 6 | 24 | 34 |
| | 5,000 (hours) | 16 | 2 | 6 | 35 | 36 |

The Examples 1 through 3 of the invention showed low-expansion characteristics with a coefficient of thermal expansion of not more than $20 \times 10^{-7}$ (1/°C.) in the temperature range of 25° C. to 800° C., and had a high melting point of higher than 1,500° C.

Furthermore, the Examples 1 through 3 of the invention showed substantially no increase of the coefficient of thermal expansion by the heat treatment at 1,100° C. for more than 2,000 hours, so that they proved to be low-expansion ceramics which has a very stable characteristics against heat treatment.

The results are also shown in attached FIG. 1.

As described in the foregoing, the low-expansion ceramics of the invention has a small coefficient of thermal expansion, a high melting point, and a high thermal stability even after being exposed to heat treatment at a temperature up to 1,400° C. for a number of hours. Whereby, the ceramics of the invention can be widely used as ceramics material in the fields where high degrees of heat-resistance, thermal shock-resistance, wear-resistance, and corrosion-resistance are required: for instance, substrate for catalyst to purify automobile exhaust gas; carriers for catalytic combustion; filters for diesel exhaust particulate; industrial or automotive ceramic heat exchangers; engine parts such as pistons, cylinder liners, combustion chambers, auxiliary combustion chambers, turbo-charger rotors or the like; gas turbine parts such as nozzles, rotors, shrouds, scrolls, plenum, combustors, tail cylinders or the like; heat-resistant ceramics material for receivers of solar energy; various refractory materials; and chinawares and porcelains for chemical industries. Therefore, the present invention contributes greatly to the industry.

What is claimed is:

1. Low-expansion ceramics essentially consisting of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$), that the major component of crystalline phase thereof is a solid solution of magnesium oxide-aluminum oxide-titanium dioxide-iron oxide, and that the ceramics have a coefficient of thermal expansion of not more than $20 \times 10^{-7}$ (1/°C.) in a temperature range of 25° C. to 800° C. and a melting point of not lower than 1,500° C., said coefficient of thermal expansion being maintained even after exposure at 1,100° C. for 1,000 hours.

2. Low-expansion ceramics as defined in claim 1, wherein the chemical composition of the ceramics consists of 2.5 to 17% by weight of magnesia (MgO), 13.5 to 62% by weight of alumina ($Al_2O_3$), 31.5 to 75% by weight of titanium in terms of titanium oxide ($TiO_2$), and 2 to 10% by weight of iron in terms of ferric oxide ($Fe_2O_3$).

3. Low-expansion ceramics as defined in claim 1, wherein the shape of ceramics is a honeycomb structure.

4. A method of producing low-expansion ceramics comprising steps of preparing a batch of compounds so as to provide a chemical composition of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$); plasticizing the batch if necessary and shaping the batch; drying the body thus formed; and firing the formed body at 1,300° C. to 1,700° C. for 0.5 to 48 hours, thereby having a coefficient of thermal expansion of less than $20 \times 10^{-7}$ (1/°C.) in a temperature range of 25° C. to 800° C. and a melting point of not lower than 1,500° C., said coefficient of thermal expansion being maintained even after exposure at 1,100° C. for 1,000 hours.

5. A method of producing low-expansion ceramics as defined in claim 4, wherein said chemical composition consists of 2.5 to 17% by weight of magnesia (MgO), 13.5 to 62% by weight of alumina ($Al_2O_3$), 31.5 to 75% by weight of titanium in terms of titanium oxide ($TiO_2$), and 2 to 10% by weight of iron in terms of ferric oxide ($Fe_2O_3$).

6. A method of producing low-expansion ceramics as defined in claim 4, wherein said compounds so selected as to provide the chemical composition of 1.5 to 20% by weight of magnesia (MgO), 6 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$) are in a mixture of materials selected from the group consisting of magnesia, magnesium carbonate, magnesium hydroxide, alumina, aluminum hydroxide, anatase type titanium dioxide, rutile type titanium dioxide, metallic iron, α type ferric oxide, γ type ferric oxide, hydrous iron oxide, and ilmenite.

7. Low-expansion ceramics having a solid solution of magnesium oxide-aluminum oxide-titanium dioxide-iron oxide as the major component of crystalline phase and that the ceramics have a coefficient of thermal expansion of not more than $20 \times 10^{-7}$ (1/°C.) in a temperature range of 25° C. to 800° C. and a melting point of not lower than 1,500° C., said coefficient of thermal expansion being maintained even after exposure 1,100° C. for 1,000 hours, said low-expansion ceramics being made by the process comprising the steps of preparing a batch of compounds so as to provide a chemical composition of 1.5 to 20% by weight of magnesia (MgO), 8 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$); plasticizing the batch if necessary and shaping the batch; drying the body thus formed; and firing the formed body at 1,300° C. to 1,700° C. for 0.5 to 48 hours.

8. Low-expansion ceramics as defined in claim 7, wherein said chemical composition consists of 2.5 to 17% by weight of magnesia (MgO), 13.5 to 62% by weight of alumina ($Al_2O_3$), 31.5 to 75% by weight of titanium in terms of titanium oxide ($TiO_2$), and 2 to 10% by weight of iron in terms of ferric oxide ($Fe_2O_3$).

9. Low-expansion ceramics as defined in claim 7, wherein said compounds so selected as to provide the chemical composition of 1.5 to 20% by weight of magnesia (MgO), 6 to 68% by weight of alumina ($Al_2O_3$), 24 to 80% by weight of titanium in terms of titanium oxide ($TiO_2$), and 0.5 to 20% by weight of iron in terms of ferric oxide ($Fe_2O_3$) are in a mixture of materials selected from the group consisting of magnesia, magnesium carbonate, magnesium hydroxide, alumina, aluminum hydroxide, anatase type titanium dioxide, rutile type titanium dioxide, metallic iron, $\alpha$ type ferric oxide, $\gamma$-type ferric oxide, hydrous iron oxide, and ilmenite.

* * * * *